United States Patent
Yang et al.

(10) Patent No.: US 8,249,030 B2
(45) Date of Patent: Aug. 21, 2012

(54) ADAPTING TXOP REQUESTS FOR MULTI-RADIO PLATFORMS

(75) Inventors: Xue Yang, Portland, OR (US); Ryan Shin, Daegu (KR); Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 578 days.

(21) Appl. No.: 11/726,980

(22) Filed: Mar. 23, 2007

(65) Prior Publication Data

US 2008/0232339 A1     Sep. 25, 2008

(51) Int. Cl.
*H04J 3/00* (2006.01)
(52) U.S. Cl. ......... 370/336; 370/445; 370/447; 455/453
(58) Field of Classification Search ............... 455/114.2, 455/556.1; 370/338, 449, 310, 336, 445, 370/447
See application file for complete search history.

(56) References Cited

U.S. PATENT DOCUMENTS

| | | | |
|---|---|---|---|
| 7,511,673 B2 * | 3/2009 | Man et al. | 343/702 |
| 2005/0157745 A1 * | 7/2005 | Fujii et al. | 370/449 |
| 2007/0076649 A1 | 4/2007 | Lin et al. | |
| 2007/0135162 A1 * | 6/2007 | Banerjea et al. | 455/556.1 |
| 2007/0230378 A1 * | 10/2007 | Tavares et al. | 370/310 |
| 2008/0062919 A1 | 3/2008 | Chen et al. | |
| 2008/0075050 A1 * | 3/2008 | Huang et al. | 370/338 |
| 2008/0146172 A1 * | 6/2008 | Makhlouf et al. | 455/114.2 |

* cited by examiner

*Primary Examiner* — Nick Corsaro
*Assistant Examiner* — Isaak R Jama
(74) *Attorney, Agent, or Firm* — Schwabe, Williamson & Wyatt, P.C.

(57) ABSTRACT

A first radio in a wireless network may request a transmit opportunity (TXOP) of a certain duration, with the duration being based a likelihood that a TXOP of that duration would cause interference with a co-located second radio. The duration may be dynamically adjusted based on the likelihood of such interference.

16 Claims, 5 Drawing Sheets

ADAPTING TXOP REQUESTS FOR MULTI-RADIO PLATFORMS

BACKGROUND

When a single wireless device support two different types of radios that cannot use the wireless medium at the same time, the radio with the most flexibility in its communications opportunities must frequently try to use the wireless medium only during times when the other radio, whose communications opportunities may be more tightly scheduled by another device, is not using the medium. For example, in a single wireless device that supports both WiFi radio and WiMAX radio, the WiFi radio may have to try accessing the medium only when the WiMAX radio is not scheduled. However, if the WiFi radio requests too much time during it communication opportunities, it's more likely to have that request refused because it would interfere with the WiMAX radio's schedule. If the WiFi radio requests too little time, it must make more requests to communicate the necessary amount of data, and too much time will be lost to the overhead of acquiring the medium.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

So called WiFi communications devices may request the use of the wireless medium by requesting a certain period of time, called a transmission opportunity (TXOP), during which the WiFi device may initiate communications without having to further contend for the medium with other WiFi devices. So called WiMAX communications devices may be more rigidly scheduled by a base station that allocates certain periods of communication time to each of multiple WiMAX devices. When concurrent WiFi and WiMAX communications capabilities are co-located in a single wireless device, a coordinator is a mechanism within the wireless device that prevents or reduces conflicts between the two radios by accepting or rejecting requests for such communications from at least one of the radios.

In various embodiments of the invention, a wireless device that contains two radios that should not communicate at the same time may dynamically adjust the duration of the communications window requested by one of the radios, based on the fraction of requests for the medium that are granted to at least one of the radios.

Figure 1:
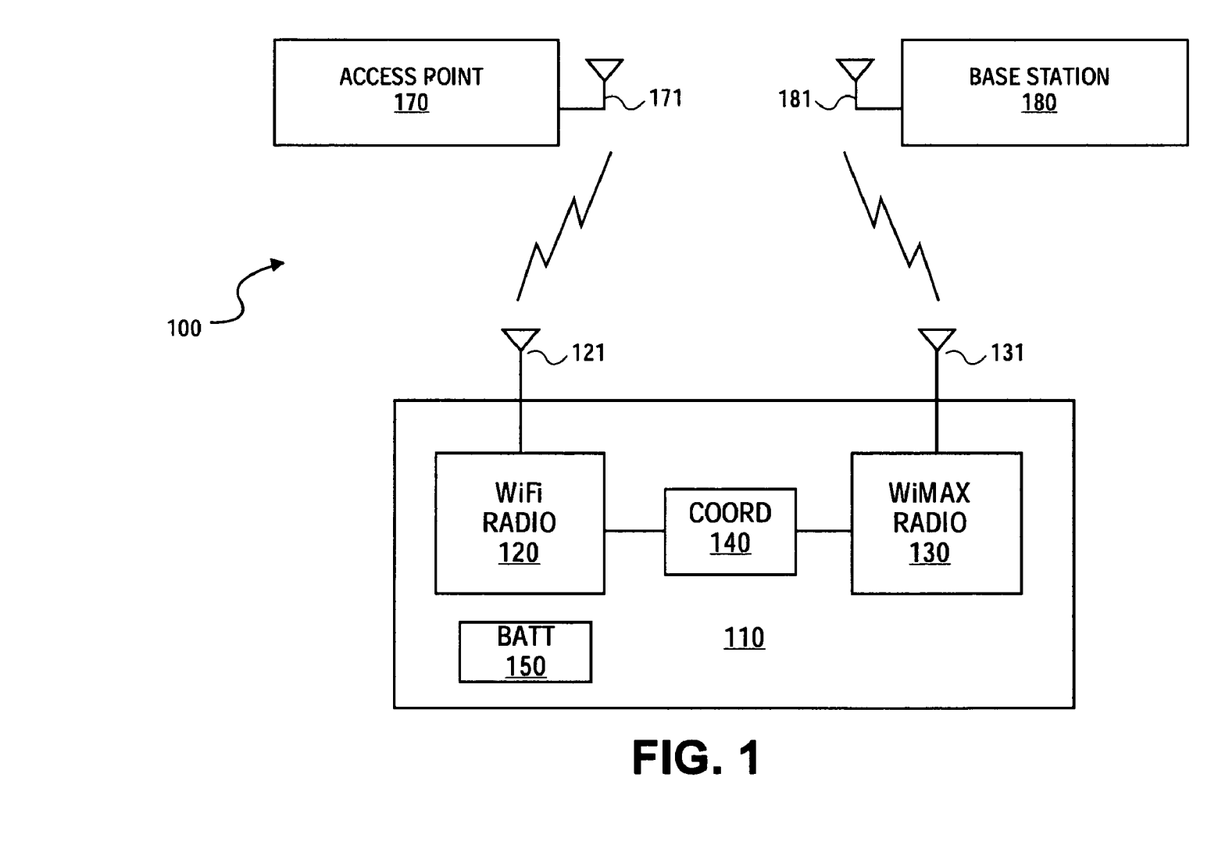
FIG. 1 shows a wireless device with two radios, each radio for communicating in a different type of network.

FIG. 1 shows a wireless device with two radios, each radio for communicating in a different type of network. In the illustrated embodiment, wireless device 110 may communicate with access point 170 in one type of network, and also communicate with base station 180 in another type of network. Although the terms 'access point' and 'base station' are used here to designate the centralized nodes in the two different networks, these labels are primarily for convenience of description, and various embodiments may encompass other communicating peer nodes or centralized nodes that are described with other labels. Within the context of this document, the term 'radio' encompasses the radio frequency (RF) circuitry to modulate signals into the proper format for RF transmission and amplify those signals to the proper power level, RF circuitry to demodulate received signals, circuitry to convert digital signals to analog and analog signals to digital, and circuitry to create and/or decipher the content of the digital signals to the extent needed to permit proper communications in the relevant network. In some embodiments each radio may contain one or more digital processors, such as a digital signal processor (DSP) and/or a general purpose processor.

Wireless device 110 includes a first radio 120 for communicating wirelessly with access point 170 through antennas 121 and 171, respectively, and a second radio 130 for communicating wirelessly with base station 180 through antennas 131 and 181, respectively. A coordinator 140 acts to coordinate the timing of communications with the two radios 120, 130, so that one radio will not be attempting to transmit while the other radio is attempting to receive. In some embodiments, wireless device 110 may be a mobile device that can communicate while moving, and may use a battery 150 to provide operating power. The two radios are labeled as a WiFi radio and a WiMAX radio, and these terms will be used frequently in this document. But some embodiments of the invention may extend to other types of radios.

Figure 2:
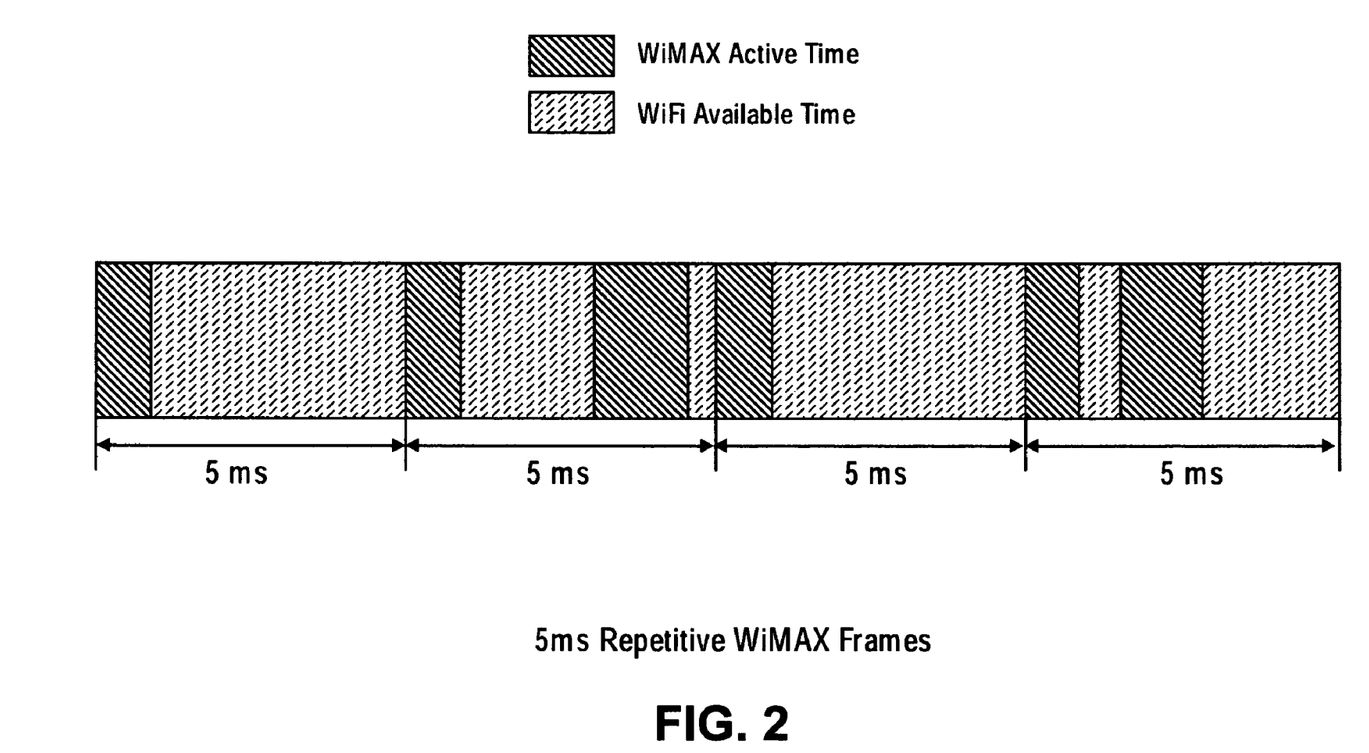
FIG. 2 shows a timing diagram of the two radios sharing the medium in a coordinated manner.

FIG. 2 shows a timing diagram of the two radios sharing the medium in a coordinated manner. In the illustrated embodiment, a base station may establish a WiMAX frame every 5 milliseconds, as shown. During each frame, the base station may authorize this WiMAX radio to communicate (transmit and/or receive) with the base station during the portions of time indicated as WiMAX active time. The beginning of each frame may be devoted to the base station establishing a communication schedule for the rest of the frame for several of the WiMAX devices active in the network at that time, and this portion is also shown as WiMAX active time, since this WiMAX radio will need to receive during that time to learn its schedule for the remainder of the frame. To avoid interference between the two radios in this wireless communications device, the WiFi radio should refrain from communicating during the times shown as WiMAX active time.

During the remaining periods of time in each frame (indicated as WiFi available time), the WiMAX radio may not communicate with the base station, and this time is therefore available to the WiFi radio to communicate with its access point. In some instances, there may be multiple blocks of such time within a single frame (for example, the second and fourth frames of FIG. 2 each show two blocks of WiFi available time). The WiFi radio might not be able to communicate during some/all of these times for other reasons, but this example only considers the effect of the WiMAX schedule.

Figure 3:
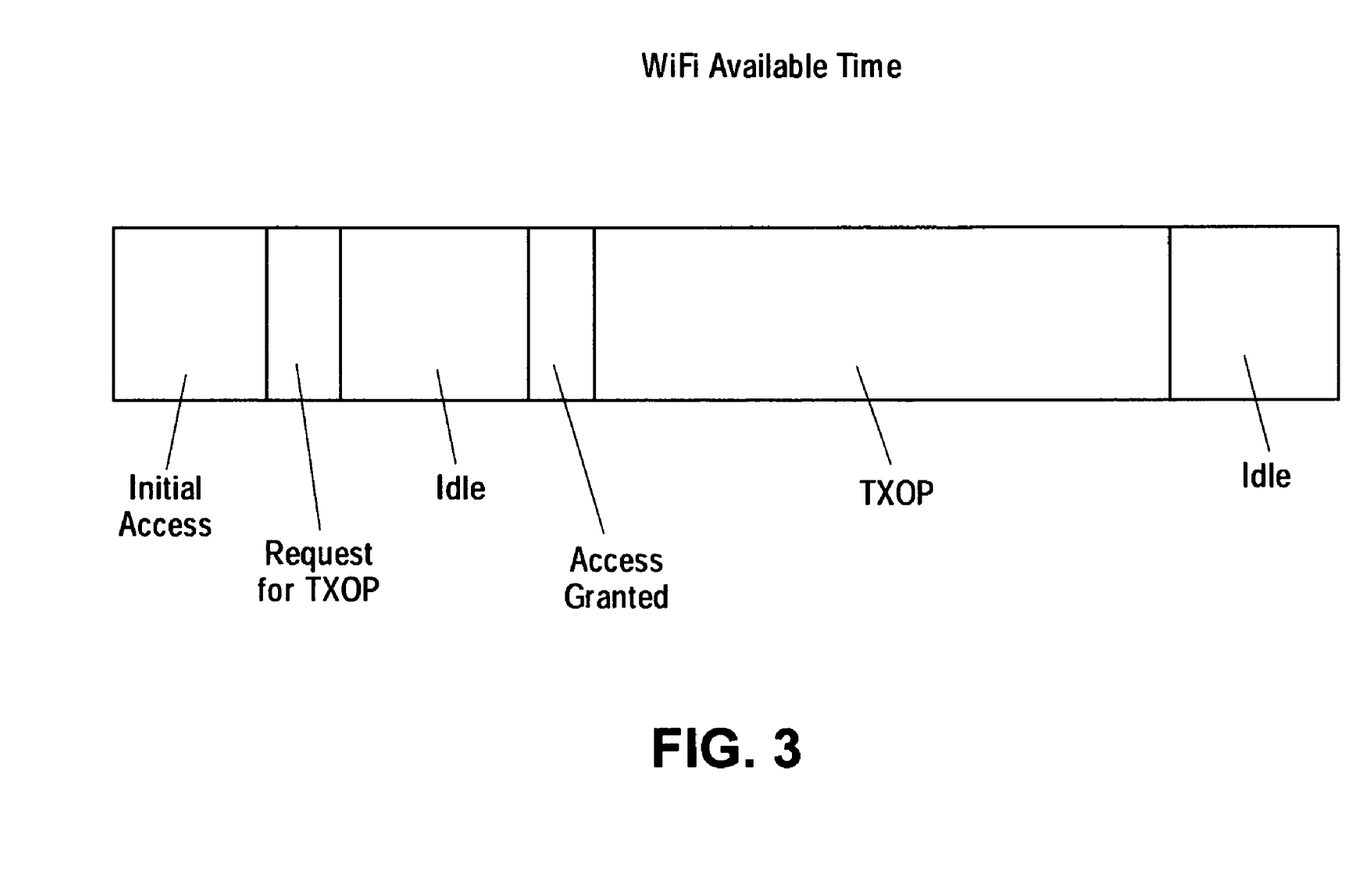
FIG. 3 shows the WiFi radio communicating during a single block of WiFi available time, according to an embodiment of the invention.

The coordinator 140 may control when the WiFi radio is able to communicate, so that the WiFi and WiMAX radios do not interfere with each other. The coordinator 140 may be implemented in any feasible manner, such as but not limited to hardware, software, firmware, or any combination of these. The coordinator may permit, or refuse to permit, the WiFi radio to request a block of communications time from its associated access point. The coordinator may monitor communications on both networks (through the two radios) in order to make this decision FIG. 3 shows the WiFi radio communicating during a single block of WiFi available time, according to an embodiment of the invention. To establish communications, the WiFi radio may need to first access the medium, and then use this access to request a block of time for more extensive communications. The amount of time needed to obtain the initial access may vary, depending on various factors such as but not limited to: the amount of other WiFi traffic involving other WiFi radios in the network, the back-off time used by this WiFi radio in the event of a collision, etc. This time is labeled Initial Access in FIG. 3. When access is finally obtained, the WiFi radio may transmit a request for a Transmission Opportunity (TXOP) to the access point. A TXOP is a specified period of time during which the WiFi radio may communicate over the network without having to contend for the medium with other WiFi radios. This request may include the desired duration of the TXOP. Depending on various factors, the WiFi radio may have to wait for the access point to answer the request, and this wait is shown as idle time. The access point then responds to the request, either rejecting or granting the request.

In the illustrated example, the request for access is granted. The grant may include the start time and duration of the TXOP. The WiFi radio may then communicate with the access point (and in some embodiments may communicate directly with other WiFi radios in the network), throughout the duration of the TXOP time period. After completion of the TXOP time period, the remainder of the WiFi available time is shown as idle time, since this WiFi radio is not using it. However, this idle time may be used by other WiFi radios, and this WiFi radio may choose to make another request for a TXOP during this idle time.

Although the access point may grant or reject the request for a TXOP based on communications traffic in the WiFi network, the access point may not know of potential conflicts between the WiFi radio and WiMAX radio within this particular mobile wireless device. Therefore, the coordinator 140 in this wireless device may resolve such potential conflicts before the WiFi radio is allowed to request a TXOP from its access point.

The various embodiments of this invention are devoted to resolving this internal conflict between the two radios that are co-located in this particular wireless device. The conflict may be addressed by adjusting the duration of the requested TXOP. Requesting a larger TXOP increases the chance that the TXOP will be rejected by the coordinator because it overlaps a scheduled WiMAX communications period and would therefore cause interference between the two radios. Requesting a smaller TXOP improves the chances that the TXOP will be granted by the coordinator, but may require requesting more TXOPs to handle the necessary volume of data. Every additional request carries its own overhead time for initial access, request for TXOP, and granting of TXOP. Therefore, it is frequently desirable to request the largest TXOP period that is likely to be granted. However, it may be difficult to determine with any certainty what that size might be, since the dynamics of the network have a very significant affect on that preferred size. The described techniques attempt to dynamically adjust the TXOP duration based on how changing conditions affect the rejection rate of these requests.

Figure 4:
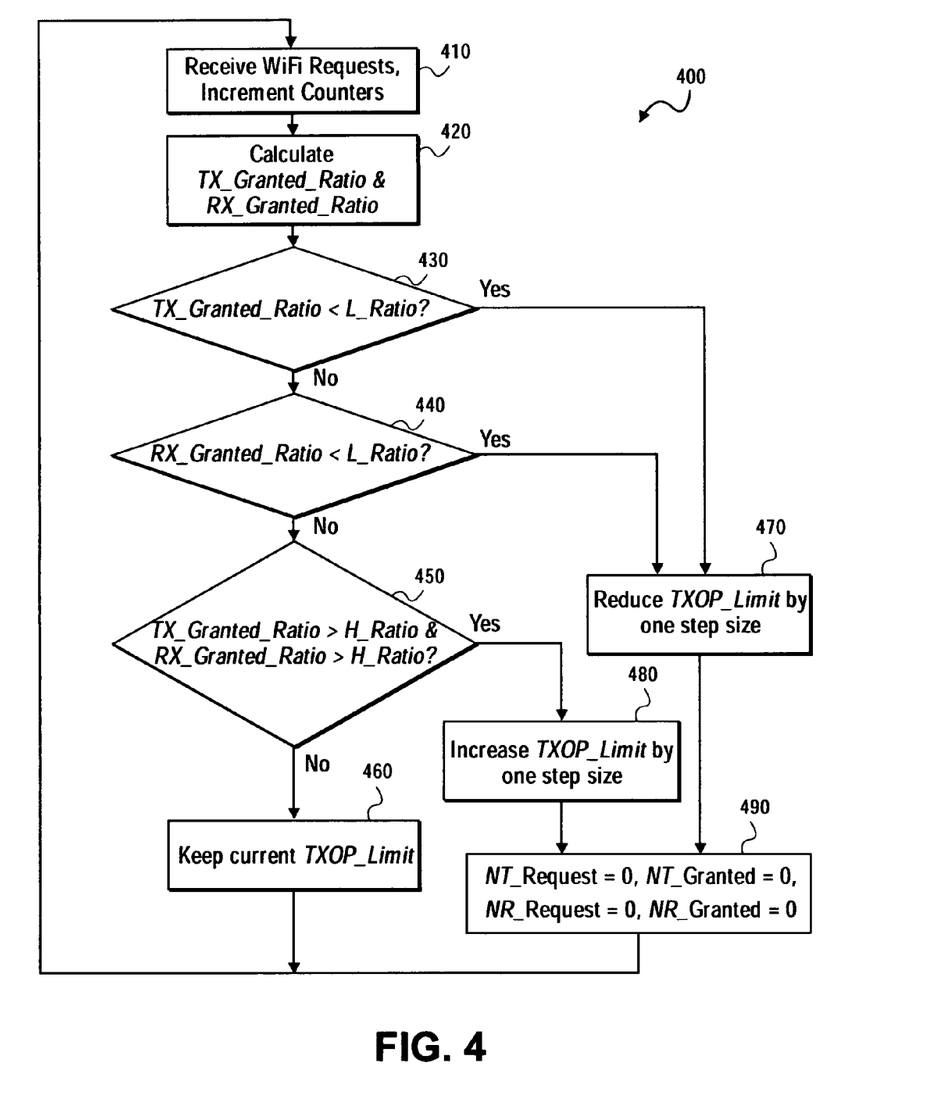
FIG. 4 shows a flow diagram of a method of dynamically adjusting the size of a the requested TXOP, according to an embodiment of the invention.

FIG. 4 shows a flow diagram of a method of dynamically adjusting the size of the requested TXOP, according to an embodiment of the invention. The adjustments may be made based on what fraction of recent Requests for TXOP have been granted. Two types of requests are considered. When a WiFi radio requests a TXOP because it wants to initiate a sequence of communications, that request may be labeled a 'transmitter-initiated request'. When the WiFi radio requests a TXOP because it has received notice that another device wishes to communicate with it (sometimes that notice may be in the form of a Request to Send, or RTS), that request for TXOP may be labeled a 'receiver-initiated request'. In the method of FIG. 4, the fraction of transmitter-initiated requests that are granted is determined separately from the fraction of receiver-initiated requests that are granted, but other embodiments may combine both types into a single parameter.

This description will use the terms described below. Note that although some parameters involve the number of requests that are granted, the number of requests that are rejected may also be used by simply inverting the relevant fraction.

TXOP_Limit—This is the maximum size of TXOP the WiFi radio will request at any given time, and this is the parameter that is dynamically adjusted. If the WiFi radio doesn't have enough data to exchange to use a TXOP of this size, it can of course request a smaller TXOP. Such requests for a TXOP that is smaller that TXOP_Limit may not be used in the calculations that are used to adjust TXOP_Limit.

TXOP_Adapt_Period—This is the period of time during which the grant or rejection rate of requests by the WiFi radio is monitored. TXOP_Limit is adjusted based on the results of this monitoring during the current TXOP_Adapt_Period. When a new TXOP_Adapt_Period is started, the calculations from the previous TXOP_Adapt_Period may be discarded, and new calculations are made.

TX_Granted_Ratio—The fraction of transmitter-initiated requests that have been granted during the current TXOP_Adapt_Period. In some embodiments, this value may be set to a default value at the start of the current TXOP_Adapt_Period.

RX_Granted_Ratio—The fraction of receiver-initiated requests that have been granted during the current TXOP_Adapt_Period. In some embodiments, this value may be set to a default value at the start of the current TXOP_Adapt_Period.

H_Ratio—An upper threshold for an acceptable range of TX_Granted_Ratio and RX_Granted_Ratio. If the ratio exceeds this value, the size of TXOP_Limit may be increased. The reasoning is that if most requests are granted, the requested size of TXOP_Limit is probably too small, resulting in too many requests being made to handle the necessary volume of data. In the described embodiment, the same value of H_Ratio is used for both transmitter- and receiver-initiated requests, but other embodiments could use a different H-Ratio for each.

L_Ratio—A lower threshold for an acceptable range of TX_Granted_Ratio and RX_Granted_Ratio. If the ratio is less than this value, the size of TXOP_Limit may be decreased. The reasoning is that if too many requests are rejected, the requested size of TXOP_Limit is probably too large, resulting in too many re-requests needing to be made. In the described embodiment, the same value of L-Ratio is used for both transmitter- and receiver-initiated requests, but other embodiments could use a different L-Ratio for each.

NT_Request—A counter used to count the number of transmitter-initiated requests that were made.

NR_Request—A counter used to count the number of receiver-initiated requests that were made.

NT_Granted—A counter used to count the number of transmitter-initiated requests that were granted.

NR_Granted—A counter used to count the number of receiver-initiated requests that were granted.

Flow diagram 400 in FIG. 4 shows the operations performed in the period of time TXOP_Adapt_Period. A new TXOP_Adapt_Period may be started based on various conditions, such as but not limited to: 1) when joining a new network, 2) at regular time-based intervals, 3) at particular points in a network communications sequence, 4) based on a triggering event, 5) etc. Each of the four counters NT_Request, NT_Granted, NR_Request, and NR_Granted, may be incremented every time the relevant request is made or granted. Some minimum number of these values must be achieved before meaningful values of TX_Granted_Ratio and RX_Granted_Ratio may be calculated. Therefore, at 410 the process may wait through a number of requests by the WiFi radio, until these counters have incremented enough to produce meaningful calculations.

Once this occurs, TX_Granted_Ratio and RX_Granted_Ratio may be calculated at 420. These values may then be compared against the threshold values L_Ratio and H_Ratio at 430, 440, and 450. If either TX_Granted_Ratio or RX_Granted_Ratio is less than L_Ratio, then TXOP_Limit may be decreased at 470 by some predetermined amount. In some embodiments the amount of decrease may be a fixed amount of time, but other embodiments may use other techniques (e.g., a percentage of the previous value). Conversely, if both TX_Granted_Ratio and RX_Granted_Ratio are greater than H_Ratio, then TXOP_Limit may be increased at 480 by some predetermined amount. As with the decrease, the amount of increase may be a fixed amount of time, a percentage increase, or some other predetermined amount of change. In some embodiments, a maximum and/or minimum size of TXOP_Limit may be enforced, regardless of the results of the calculations.

If TXOP_Limit has been changed at 470 or 480, then the counters NT_Request, NR_Request, NT_Granted, and NR_Granted may each be reset to zero at 490, so that new calculations may be made with this new value of TXOP_Limit, and the process may start over at 410. As before, it may be necessary to wait at 410 until enough requests have been received to produce meaningful counter values.

If none of the conditions at 430, 440, or 450 are met (i.e., if both TX_Granted_Ratio and RX_Granted_Ratio are greater than L_Ratio, and at least one of those is below H_Ratio), then the value of TXOP-Limit may remain unchanged at 460. In some embodiments, these four counters will be reset to zero before returning to 410 and again accumulating enough requests to produce meaningful counter values for the next set of calculations. In other embodiments, the current value of the counters may remain, to be modified by the responses to subsequent TXOP requests.

Figure 5:
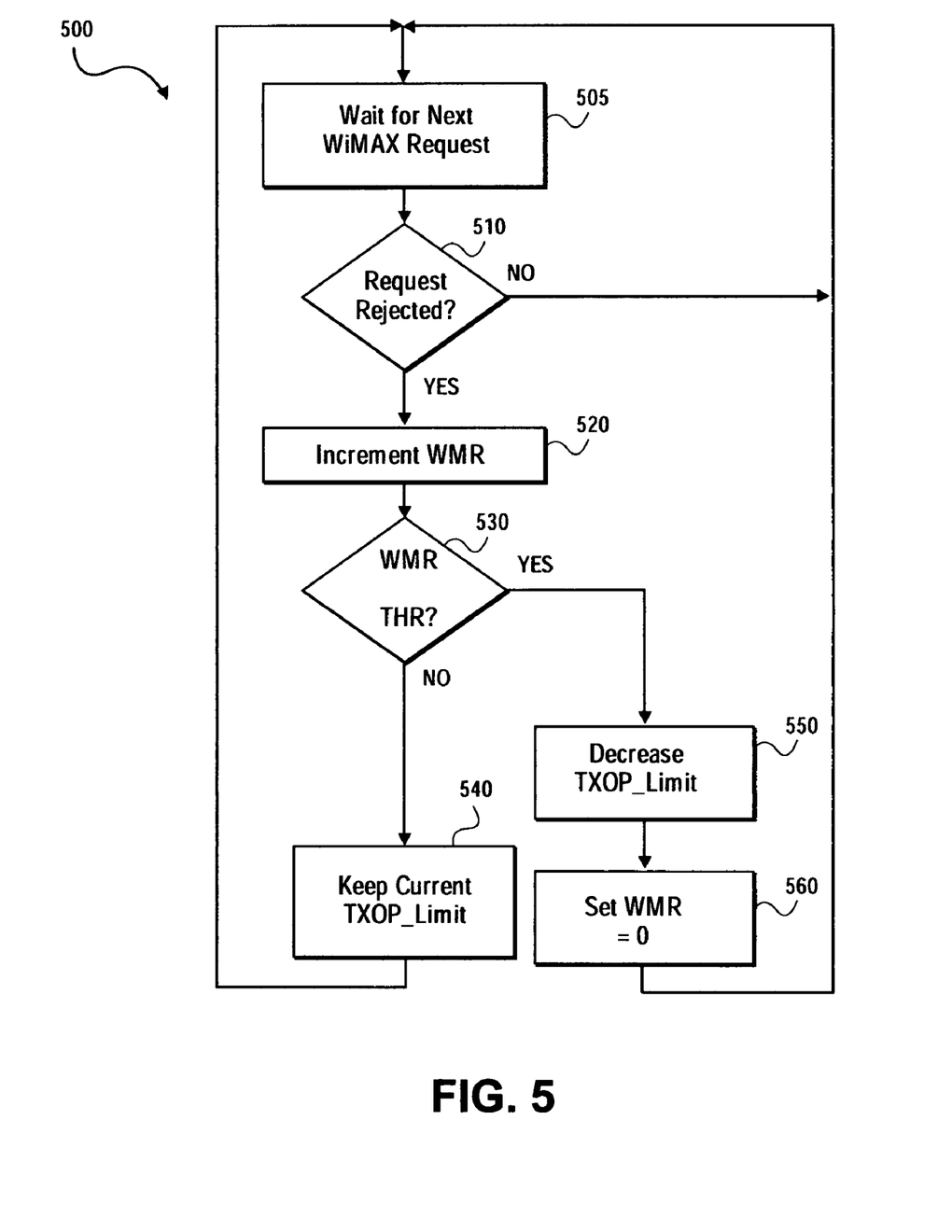

FIG. 5 shows a flow diagram of another method of dynamically adjusting the size of the requested TXOP, according to an embodiment of the invention. In some types of networks, the WiMAX radio may request the medium on an ad hoc basis rather than waiting for its associated base station to pre-schedule the WiMAX radio's communications time. Such requests may be made through the coordinator 140 (see FIG. 1), as are requests from the WiFi radio. The coordinator may then approve or deny permission for the WiMAX radio to transmit the request to its base station. In such an environment, the length of the TXOP duration of the WiFi radio may affect the rejection rate of the WiMAX radio, with a longer TXOP duration making it more likely that the WiMAX radio's request will be rejected because it would interfere with the WiFi radio's communications that are already in progress. To reduce the chances of such rejections, the coordinator may follow the method shown by flow diagram 500 in FIG. 5, which dynamically adjusts the length of the WiFi radio's TXOP-Limit based on the number of rejections received by the WiMAX radio.

Two new parameters are used in FIG. 5:

WMR—a counter that keeps track of how many requests from the WiMAX radio have been rejected.

THR—A threshold value for WMR. Once WMR reaches this threshold, the value of TXOP_Limit may be changed.

At 505 and 510, the coordinator may determine whether the most recent WiMAX request has been rejected. If not, it waits for the next request. If it has been rejected, the counter WMR is incremented at 520 and compared with THR at 530. If WMR is still less than THR, the current value of TXOP-Limit is maintained at 540, and the coordinator returns to 505 to wait for the results of the next request by the WiMAX radio. But once WMR reaches the threshold value at 530, the value of TXOP_Limit is decreased at 550, and WMR is reset to zero at 560 so that the system may be monitored again to determine what effect this new value of TXOP_Limit has on the WiMAX rejection rate.

The foregoing description is intended to be illustrative and not limiting. Variations will occur to those of skill in art. Those variations are intended to be included in the various embodiments of the invention, which are limited only by the spirit and scope of the following claims.

What is claimed is:

1. A method, comprising:
    transmitting, by a first radio of a platform to a coordinator of the platform over a period of time, multiple requests for transmission opportunities in a wireless network, wherein the coordinator is to coordinate transmissions of the first radio and a second radio of the platform;
    receiving, by the first radio from the coordinator, rejections of at least some of the multiple requests, wherein the rejections are based at least partly on whether a requested transmission opportunity for the first radio would overlap with a communications period designated for the second radio;
    monitoring a rejection rate of the requests;
    comparing the rejection rate to a predetermined threshold; and
    adjusting, based at least partly on the comparing, a length of a transmission opportunity limit applicable to subsequent requests for transmission opportunities by the first radio.

2. The method of claim 1, wherein the first radio is a WiFi radio.

3. The method of claim 1, wherein the rejection rate is based at least partly on a ratio of a number of requests made to communicate compared to a number of rejections of those requests.

4. The method of claim 2, wherein the second radio is a WiMAX radio.

5. The method of claim 1, wherein the length of the requested transmission opportunity is limited to a predetermined maximum size.

6. An apparatus including
    a wireless communications device comprising a WiFi radio, a WiMAX radio, and a coordinator coupled between the WiFi radio and the WiMAX radio, the coordinator configured to:
    monitor a rejection rate of multiple requests for transmission opportunities by the WiFi radio to access a wireless medium;
    compare the rejection rate to a predetermined threshold; and
    adjust, based at least partly on the comparison, a length of a transmission opportunity limit applicable to subsequently requests for transmission opportunities.

7. The apparatus of claim 6, wherein the coordinator is to:
    monitor the rejection rate of requests by the WiFi radio; and
    adjust the length of the transmission opportunity limit applicable to the WiFi radio.

8. The apparatus of claim 7, wherein the coordinator is further to base the rejection rate at least partly on a ratio of a number of requests made by the WiFi radio to communicate compared to a number of rejections of those requests.

9. The apparatus of claim 7, wherein the coordinator is to reject one or more of the multiple requests based at least partly on whether the requested transmission opportunity would overlap with a communications period designated for the WiMAX radio.

10. The apparatus of claim 6, wherein:
    said monitoring comprises monitoring the rejection rate of requests by the WiMAX radio; and
    said adjusting comprises adjusting the length of the transmission opportunity limit applicable to the WiFi radio.

11. The apparatus of claim 6, further comprising a first antenna coupled to the WiFi radio and a second antenna coupled to the WiMAX radio.

12. An article of manufacture having one or more non-transitory storage media that include instructions that, when executed, cause a wireless communication device to:
    transmit multiple requests for transmission opportunities, for a first radio of the wireless communication device, in a wireless network;
    receive rejections of at least some of the multiple requests, wherein the rejections are based at least partly on whether a requested transmission opportunity for the first radio would overlap with a communications period designated for a second radio of the wireless communication device;
    monitor a rejection rate of the requests;
    compare the rejection rate to one or more thresholds; and
    adjust, based at least partly on the comparison, a length of a transmission opportunity limit applicable to subsequent requests for transmission opportunities by the first radio.

13. The article of claim 12, wherein the adjustment includes:
    a reduction of the length if the rejection rate is above a high threshold; or
    an increase of the length if the rejection rate is below a low threshold.

14. The article of claim 12, wherein the rejection rate is a first rejection rate for transmitter-initiated requests, the length of the transmission opportunity limit is applicable to subsequent transmitter-initiated requests, and the instructions, when executed, further cause the wireless communication device to:
    monitor a second rejection rate for receiver-initiated requests;
    compare the first rejection rate to a first threshold;
    compare the second rejection rate to a second threshold; and
    adjust, based at least partly on the comparison of the second rejection rate to the second threshold, a length of a transmission opportunity applicable to subsequent receiver-initiated requests.

15. An apparatus comprising:
    a WiMAX radio;
    a WiFi radio; and
    a coordinator configured to
        monitor a rejection rate of requests, from the WiMAX radio, to access a wireless medium,
        compare the rejection rate to a pre-determined threshold, and
        adjust, based at least partly on the comparing, a length of a maximum size of a transmission opportunity (TXOP) request permitted by the WiFi radio.

16. The apparatus of claim 15, wherein the coordinator is further configured to:
    set a value of a counter to track the number of rejections;
    compare the value of the counter to a predetermined threshold; and
    reduce the length based at least partly on said comparison.

* * * * *

UNITED STATES PATENT AND TRADEMARK OFFICE
CERTIFICATE OF CORRECTION

| | | |
|---|---|---|
| PATENT NO. | : 8,249,030 B2 | Page 1 of 1 |
| APPLICATION NO. | : 11/726980 | |
| DATED | : August 21, 2012 | |
| INVENTOR(S) | : Yang et al. | |

It is certified that error appears in the above-identified patent and that said Letters Patent is hereby corrected as shown below:

In the Claims

Column 7, Claim 6,

Lines 49-50, "6. ...applicable to subsequently requests for..." should read --6. ...applicable to subsequent requests for...--.

Signed and Sealed this
Tenth Day of June, 2014

Michelle K. Lee
*Deputy Director of the United States Patent and Trademark Office*